Feb. 19, 1952 — L. E. ASKE — 2,586,452
FAN FOR COOLING INDUCTION MOTORS
Filed Dec. 7, 1946
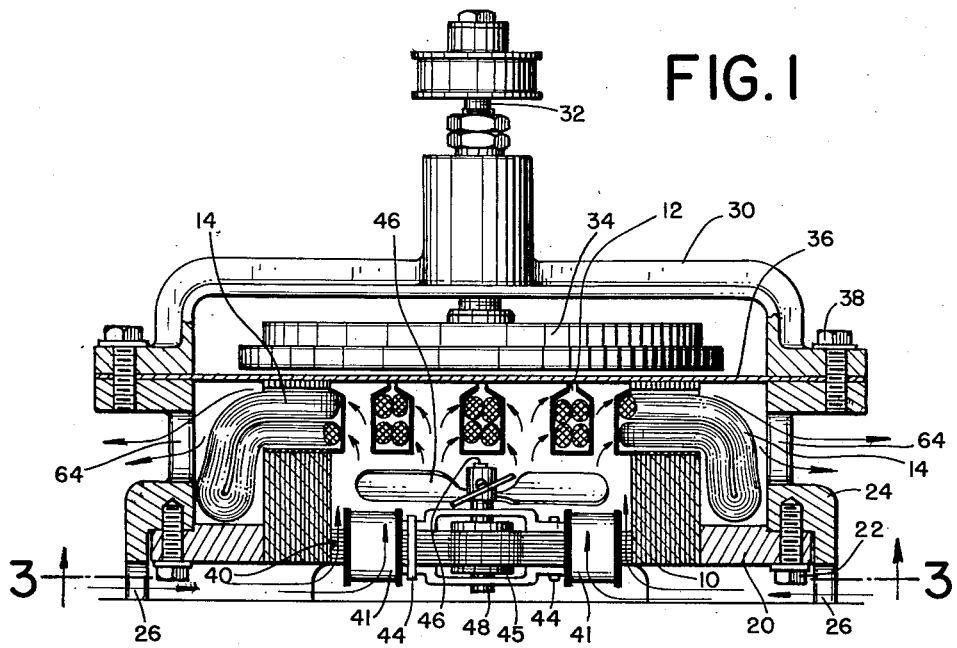
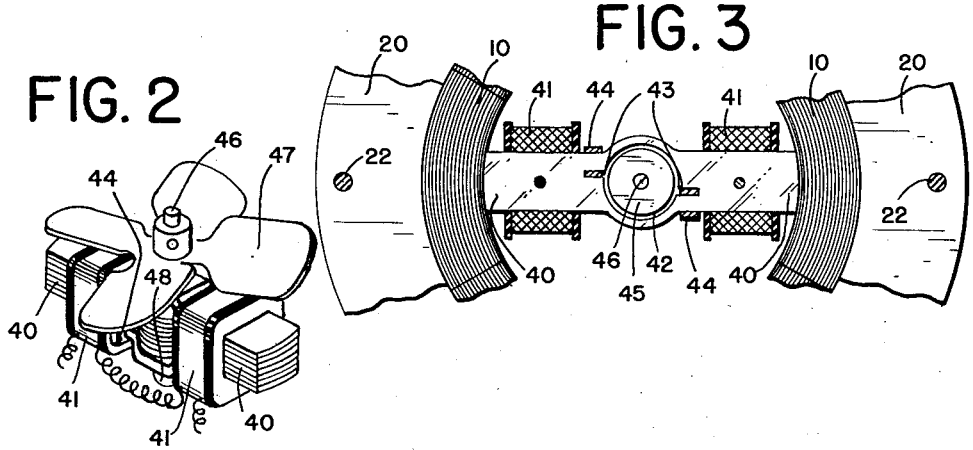
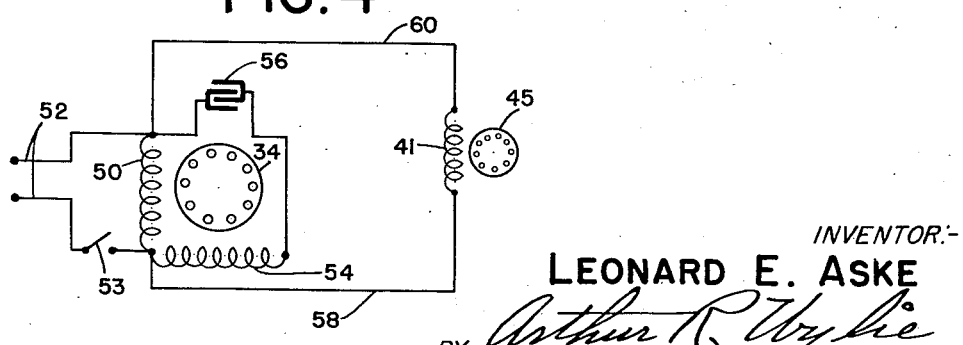
INVENTOR.-
LEONARD E. ASKE
BY Arthur R. Wylie
ATTY Patented Feb. 19, 1952

2,586,452

UNITED STATES PATENT OFFICE 2,586,452

FAN FOR COOLING INDUCTION MOTORS

Leonard E. Aske, Minneapolis, Minn., assignor to General Mills, Inc., a corporation of Delaware Application December 7, 1946, Serial No. 714,776

8 Claims. (Cl. 172—120)

This invention relates to a fan for cooling induction motors, particularly of the pancake type.

An object of this invention is the provision of a self-contained simple economical fan for use in the stator of induction motors for cooling the field coils and associated parts particularly in a pancake type motor where the stator is sealed off from the rotor.

A further object of this invention is to provide an air cooled pancake type induction motor whereby the rotor is sealed off from its stator and either one may be removed for repair without involving the other.

These and other objects, as will hereinafter appear, are accomplished by this invention, which is fully described in the following specification and shown in the accompanying drawings in which Fig. 1 is a longitudinal section through an electric motor embodying the invention;

Fig. 2 is a perspective view of the fan motor apart from the induction motor with which it is associated;

Fig. 3 is a partial section on the line 3—3 of Fig. 1; and

Fig. 4 is a wiring diagram for the pancake type induction motor and fan motor combined.

The embodiment illustrated comprises an induction motor having a laminated motor core 10 with radial slots 12 therein through which run the starting and running field coils 14. The laminated stator core 10 is supported by means of a shrink ring 20 of aluminum or the like serving also as a mounting ring and cap screws 22 screwed into a non-magnetic main frame 24 which, as here shown, has legs 26 adapted to rest on a flat surface.

A yoke 30 overlies the frame 24 and has a motor shaft 32 journaled in suitable bearings therein. This shaft carries, at its lower end, a rotor 34 which overlies the laminated motor core which may be circular, octagonal, or the like.

A relatively thin sheet of non-magnetic material 36 of high electrical resistivity, such as non-magnetic stainless steel, preferably lies between the rotor and the stator core field 10, and this sheet is clamped between the yoke 30 and the frame 24 as by means of a series of cap screws 38.

To cool the field windings in the stator I have provided a small induction motor consisting of bundles of laminated electric sheet steel secured together by rivets to form a field core 40 about which are placed small field coils 41 to form a motor, preferably of the well-known shaded pole type. This field core 40 has a circular central opening 42 with lateral slots 43 and through the latter pass copper rings 44 which serve as shading coils in a well-known manner. A rotor 45 is mounted on a shaft 46 for rotation in the opening 42. This shaft is journaled in suitable bearings 48 and carries fan blades 47 for drawing air in through the openings between legs 26 and forcing it out through the spaces between the field coils 14 and the slots 12 to cool said coils.

The arcuate stator core sections 10 are first shrunk together by an aluminum shrink ring. Then, the fan motor is pressed into circular center opening of the stator core thereby providing a return path for the lines of magnetic flux generated in the fan motor field core. At the same time, good magnetic permeability is obtained between the laminated members of cores 10 and 40. The magnetic flux lines pass through the fan motor and return through the laminated motor core 10.

The wiring diagram, shown in Fig. 4, shows the main field winding 50 placed across the main power line 52 with a line switch 53 while an auxiliary field winding 54 is in series with a suitable capacitance 56, and these two are in shunt with the main winding 50. The rotor 34 is shown adjacent the field windings. The fan motor windings 41, shown in Fig. 3, are connected through leads 58, 60 in parallel with the main field winding 50. The rotor 45 of the fan motor is placed adjacent the field winding 41.

Thus, it will be seen that I have provided a very simple and efficient type of fan motor which can be placed inside the stator and which requires very little power to furnish the necessary movement of air to cool the coils. Air is brought in through the openings 26, passes out around the various field coils, and escapes to the air through opening 64.

This permits the rotor, which has no parts which are liable to be injured by heat or by an overload, to be sealed up within a container of which the sheet 36 becomes a seal-off between the stator and rotor. The stator windings can then be readily removed and repaired or renewed should a short or other injury cause them to become grounded.

While I have shown and described but a single embodiment of my invention, it is to be understood that it is capable of many modifications. Changes, therefore, may be made which do not depart from the spirit and scope of my invention as disclosed in the appended claims.

I claim as my invention:

1. In combination, a laminated stator field core for an induction motor, a field winding thereon, a separate motor driven fan for cooling said winding, said fan motor located within the core and having shaded pole pieces made up of laminations which are magnetically connected to opposite sides of the stator field core for completing the magnetic flux path, and field windings on the pole pieces.

2. In combination, a laminated stator field core for an induction motor, a field winding thereon, a separate motor driven fan for cooling said winding, said fan motor located within the core and having shaded pole pieces made up of laminations which are magnetically connected to opposite sides of the stator field core for completing the magnetic flux path, and field windings on the pole pieces, the windings of the fan motor and the main winding of the induction motor being in parallel.

3. In combination, a laminated stator field core for an induction motor, a field winding thereon, a separate motor driven fan for cooling said winding, said fan motor located within the core and having shaded pole pieces made up of laminations which are magnetically connected to opposite sides of the stator field core for completing the magnetic flux path, field windings on the pole pieces, the windings of the fan motor and the main winding of the induction motor being in parallel, and an auxiliary winding on the main motor in series with a capacitance, and both placed in parallel with the main winding on the induction motor and with the winding on the fan motor.

4. An axial pole induction motor comprising an annular stator core, a rotor axially separated from the stator, a fan for cooling the stator, and a separate motor for driving the fan, the fan motor having a stator mounted within said annular stator core and having pole pieces magnetically connected to the core at spaced points for completion of a magnetic path through the core.

5. A motor according to claim 4 having a transverse partition between the stator and rotor, the fan motor and fan being separated from the rotor by the partition.

6. In an axial pole induction motor comprising an annular stator core having axially extending poles separated by slots with field windings therein and also having an open central chamber, a rotor axially spaced beyond the poles at one end of the chamber, and an imperforate partition between the stator and rotor closing one end of the chamber and preventing air circulation between the stator and rotor, the improvement comprising a separate fan mounted substantially wholly within the chamber, a fan rotor connected to the fan and also mounted within the chamber, and stator pole pieces within the chamber operatively driving the fan rotor and fan and causing circulation of fluid toward the partition and out through the slots to cool said windings.

7. In an axial pole induction motor comprising an annular stator core having axially extending poles with field windings thereon and an open central chamber, a rotor axially spaced beyond the poles at one end of the chamber, and an imperforate partition between the stator and rotor closing one end of the chamber and preventing air circulation between the stator and rotor, the improvement comprising a separate fan motor having its own stator, stator field winding and rotor mounted substantially wholly within the chamber.

8. An axial pole induction motor comprising an annular stator core having axially extending poles and an open central chamber, a field winding on the stator core, a fan motor and fan having a second stator located substantially wholly within the chamber, and a separate field winding on the second stator, the second stator having poles connected at spaced points to the annular stator core for completion of a magnetic path between the poles through the core.

LEONARD E. ASKE.

REFERENCES CITED

The following references are of record in the file of this patent:

UNITED STATES PATENTS

| Number | Name | Date |
|---|---|---|
| 592,244 | Fay | Oct. 26, 1897 |
| 953,219 | Muller | Mar. 29, 1910 |
| 1,017,257 | Frankerfield | Feb. 13, 1912 |
| 1,751,424 | Rosenthal | Mar. 18, 1930 |
| 2,260,833 | Elge | Oct. 28, 1941 |